United States Patent [19]

Imoto

[11] Patent Number: 4,871,221
[45] Date of Patent: Oct. 3, 1989

[54] OPTICAL WAVEGUIDE DEVICE
[75] Inventor: Katsuyuki Imoto, Sayama, Japan
[73] Assignee: Hitachi, Ltd., Tokyo, Japan
[21] Appl. No.: 284,633
[22] Filed: Dec. 15, 1988
[30] Foreign Application Priority Data Dec. 25, 1987 [JP] Japan .................................. 62-327143

[51] Int. Cl.$^4$ .............................................. G02B 6/10
[52] U.S. Cl. ................................ 350/96.12; 350/96.29
[58] Field of Search ............... 350/96.11, 96.12, 96.13, 350/96.14, 96.15, 96.29, 96.30, 96.33, 96.34

[56] References Cited

U.S. PATENT DOCUMENTS

| 4,652,076 | 3/1987 | Unger | 350/96.12 |
| 4,674,827 | 6/1987 | Izutsu et al. | 350/96.12 |
| 4,679,892 | 7/1987 | Haisma et al. | 350/96.12 |
| 4,690,488 | 9/1987 | Gee et al. | 350/96.12 |
| 4,730,884 | 3/1988 | Seino et al. | 350/96.12 |
| 4,749,245 | 6/1988 | Kawatsuki et al. | 350/96.12 |
| 4,755,014 | 7/1988 | Stoll et al. | 350/96.12 |
| 4,755,015 | 7/1988 | Uno et al. | 350/96.12 |
| 4,763,019 | 8/1988 | Duguay et al. | 307/427 |
| 4,773,720 | 9/1988 | Hammer | 350/96.12 |

OTHER PUBLICATIONS

OEC '86 Technical Digest, Jul. 1986, Tokyo, A3-3, pp. 22-23.

Primary Examiner—William L. Sikes
Assistant Examiner—Akm E. Ullah
Attorney, Agent, or Firm—Pennie & Edmonds

[57] ABSTRACT

An optical waveguide device comprises a low refractive index layer having a refractive index $n_b$, a core layer having a refractive index $n_c$ (where $n_c > n_b$) and a cladding layer having a refractive index $n_{cl}$ (where $n_{cl} < n_c$) formed on a substrate. Thermal expansion coefficients of the low refractive index layer, the core layer and the cladding layers, respectively, are made substantially equal to each other at respective boundaries.

6 Claims, 7 Drawing Sheets

OPTICAL WAVEGUIDE DEVICE

BACKGROUND OF THE INVENTION

The present invention relates to an optical waveguide device which is less or scarcely dependent on the plane of polarization.

In the optical fiber communication, the light wavelength multiplex transmission technique is very important from the view point of achieving economy and flexibility of the optical communication system. On the other hand, optical coupling/branching devices are indispensable for the light wavelength multiplex transmission.

In conjunction with fabrication method of the optical coupling/branching device, there is noticed in recent years the trend of studying and developing a waveguide structure of the optical coupling/decoupling device, aiming for implementation in a one-chip monolithic structure and reduction of manufacturing cost. A typical example of such optical device, there can be mentioned a directional coupler type optical branching device disclosed in N. Takato et al's article entitled "Low-loss Directional Coupler Using High-silica Embedded Channel Waveguides" contained in "OEC '86 Technical Digest", A3-3 (July, 1986), pp. 22 and 23. In this known device, optical branching characteristics are obtained by making use of the fact that the coupling of two optical waveguides is dependent on wavelength. More specifically, light signals of wavelengths $\lambda_1$ and $\lambda_2$ inputted to a first port travel through a coupling region while reciprocating periodically between two cores, wherein the light signal of wavelength $\lambda_1$ is led out through a third port with the light signal of wavelength $\lambda_2$ being taken out from a fourth port. For the substrate of the optical device, a Si-substrate or $SiO_2$-substrate is usually employed. A low refractive index layer (having a refractive index $n_b$) is formed of a $SiO_2$-film. The refractive index $n_c$ of the core has to be greater than the index $n_b$ of the low refractive index layer. For this reason, the $SiO_2$-film is ordinarily doped with refractive index controlling dopant such as $TiO_2$, $P_2O_5$, $GeO_2$ or the like. A cladding layer is formed of a material having the same refractive index as that ($n_b$) of the buffer layer (low refractive index layer) and is usually formed from $SiO_2$.

In the structure of the optical waveguide device mentioned above, thermal expansion coefficients of the core, the low refractive index layer and the cladding layer differ from one another. FIG. 11A of the accompanying drawings shows relations between the contents of various dopants and the refractive indexes, and FIG. 11B shows relations between the content of various dopants and the thermal expansion coefficients. As will be seen in FIGS. 11A and 11B, when the dopant $TiO_2$, $GeO_2$, $P_2O_5$ or other is contained in $SiO_2$, the thermal expansion coefficient of the latter assumes correspondingly different values. Further, as the content of dopant increases, magnitude of change in the thermal expansion coefficient becomes more remarkable. As a consequence, thermal stress is produced between the core and the cladding, between the core and the low refractive index layer and additionally between the low refractive index layer and the substrate. The thermal stress in tern brings about anisotropy in the refractive indexes, resulting in occurrence of shift of wavelength which exerts adverse influence on the coupling efficiency between $E^{11X}$-mode and $E^{11Y}$-mode. The wavelength shift involves degradation in isolation in the optical waveguide coupling/branching device, leading to increasing of the cross-talk between the light signals of different wavelengths.

SUMMARY OF THE INVENTION

An object of the present invention is to provide an optical waveguide coupling/branching device as well as other optical waveguide devices which are substantially immune to the drawbacks mentioned above.

In view of the above and other objects which will be more apparent as description proceedes, there is provided according to an aspect of the present invention an optical waveguide device constituted by an optical waveguide including a low refractive index layer, a core layer and a cladding layer formed on a substrate, wherein values of the thermal expansion coefficient are made substantially equal to one another in the boundary planes between the low refractive index layer, the core layer and the cladding layer.

As described previously, the core layer is in contact with the low refractive index layer and the cladding layer. Accordingly, by selecting the material composition such that the respective thermal expansion coefficients at the boundaries between the core layer and the other layers are substantially equal to each other, the thermal stress due to difference in the thermal expansion coefficient can be alleviated.

DESCRIPTION OF THE PREFERRED EMBODIMENTS

Figure 1A:
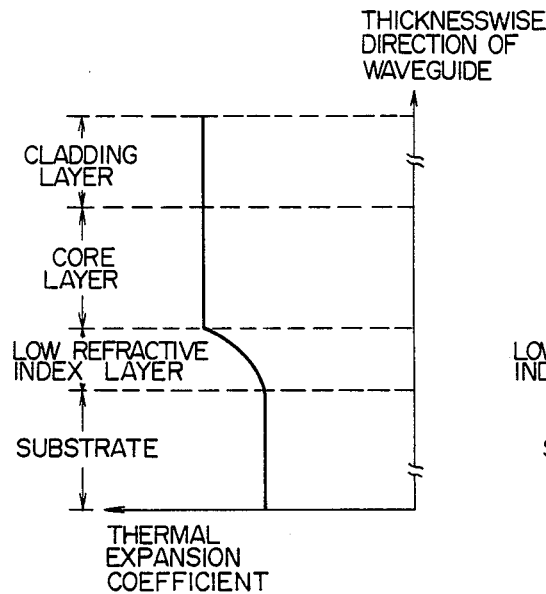
FIGS. 1A to 4B are sectional views illustrating distributions of thermal expansion coefficients and refractive indexes in optical waveguide devices according to exemplary embodiments of the invention, respectively, in the direction thicknesswise of the device.
Figure 1B:
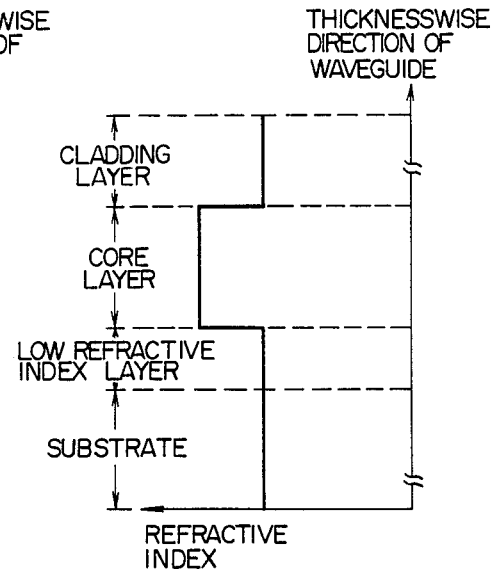
Figure 10A:
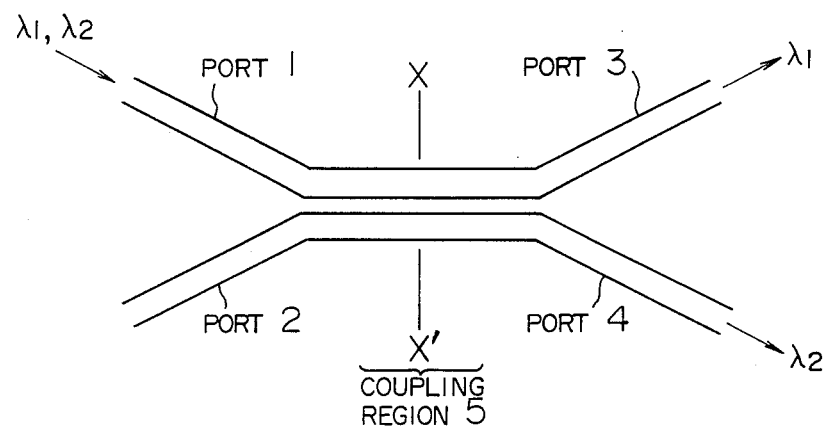
FIGS. 10A and 10B are views showing a structure of the optical waveguide coupling/branching device according to an embodiment of the invention.
Figure 10B:
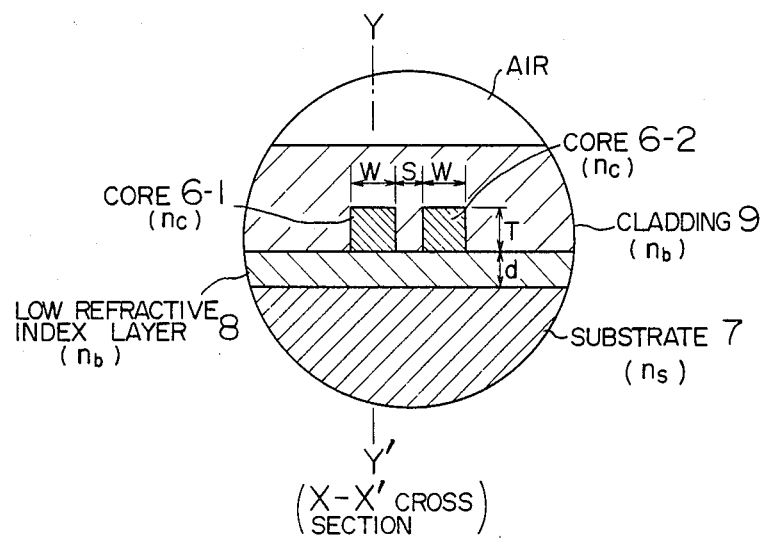
Figure 11A:
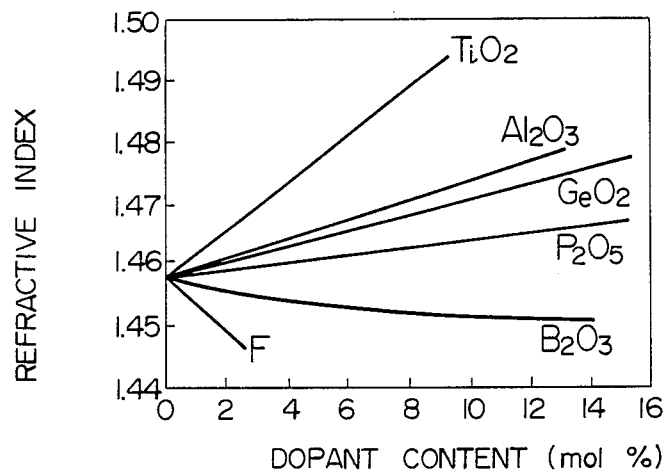
FIG. 11A is a view showing relations between contents of dopants used for realizing the optical waveguide device according to the invention and refractive indexes thereof.
Figure 11B:
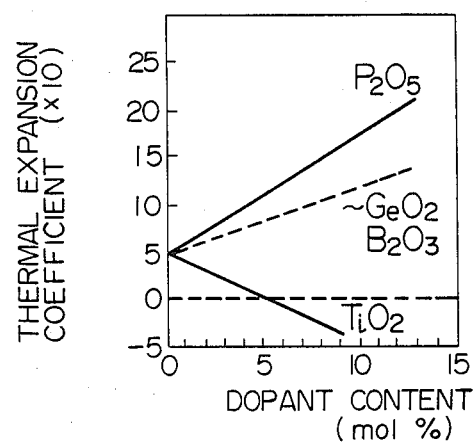
FIG. 11B is a view showing relations between dopant contents and the thermal expansion coefficients in the optical waveguide device according to the invention.

FIGS. 10A and 10B show an optical waveguide couplng/branching device according to a first embodiment of the present invention. Referring to the figures, a reference numeral 7 denotes a $SiO_2$-substrate of 2 inches in diameter and 0.45 mm in thickness. A $SiO_2$-film of 4 $\mu$m in thickness doped with $B_2O_3$ and $P_2O_5$ is formed on the $SiO_2$-substrate 7 to serve as a low reference index layer 8. In that case, the contents of dopants $B_2O_3$ and $P_2O_5$ are increased progressively in the direction thicknesswise. More specifically, in the plane over which the $SiO_2$-film or low refractive index layer 8 lies in contract with the $SiO_2$-substrate 7, the layer 8 contains no dopants. As the thickness of the low refractive index layer 8 is increased, the contents of the dopants $B_2O_3$ and $P_2O_5$ are increased so that the thermal expansion coefficient of the low refractive index layer 8 is increased continuously (or substantially continuously or stepwise), as will be seen in FIG. 1A which shows distribution of the thermal expansion coefficient in Y—Y section of the device shown in FIG. 10B. The pure $SiO_2$-film portion as well as the $SiO_2$-film doped with $B_2O_3$ and $P_2O_5$ mentioned above can be formed by a CVD (chemical vapour deposition) method, a sputtering method, a flame deposition method or the like. By changing continuously the thermal expansion coefficient in this manner, thermal stress due to difference in the thermal expansion coefficient between the substrate 7 and the low refractive index layer 8 can be alleviated. On the other hand, core layers 6-1 and 6-2 are so formed that the thermal expansion coefficient thereof is substantially equal to that of the low refractive index layer 8 at the boundaries between the layers 6-1 and 6-2 and the layer 8, whereby thermal stress is prevented from being produced at the boundaries. Further, a cladding layer 9 is also formed to have the thermal expansion coefficient equal to that of the core layers 6-1 and 6-2 at the boundaries. Accordingly, no thermal stress can take place at the boundaries between the cladding layer 9 and the core layers 6-1 and 6-2. It should be noted that distribution of the refractive indexes is realized such that the refractive index $n_c$ of the core layers 6-1 and 6-2 is larger than those of the low refractive index layer 8 and the cladding layer 9. Next, description will be directed to a numerical example of the optical waveguide device. The core layers 6-1 and 6-2 are each constituted by a phosphosilicate glass film (having a thickness of about 8 $\mu$m) formed of $SiO_2$ doped with about 3 mol % of $P_2O_5$. The cladding layer 9 is constituted by a phosphoborosilicate glass film (having a thickness of about 18 $\mu$m) formed of $SiO_2$ doped with about 3 mol % of $B_2O_3$ and about 3 mol % of $P_2O_5$. The low refractive index layer 8 is also constituted by the phosphoborosilicate glass film mentioned above, whose composition is however so selected that no dopants are present in $SiO_2$ in the plane over which the low refractive index film 8 contacts with the $SiO_2$-substrate 7 and contents of dopants $P_2O_5$ and $B_2O_3$ are increased by substantially equal amount in mol %, as the thickness of the low refractive index layer 8 is increased (i.e. distance of the layer 8 from the substrate 7 is increased), until the contents of the dopants $P_2O_5$ and $B_2O_3$ in $SiO_2$ have attained about 3 mol %, respectively, at or in the vicinity of the boundary to the core layers 6-1 and 6-2. In this manner, the characteristics illustrated in FIGS. 1A and 1B can be realized, the reasons for which will be readily understood by referring to FIGS. 11A and 11B.

Figure 2A:
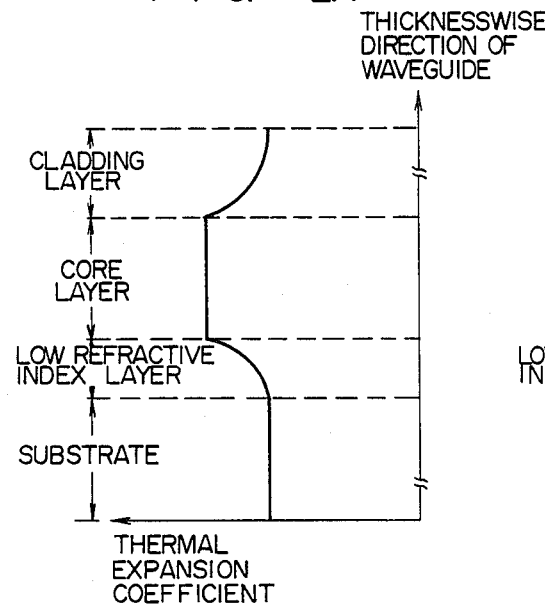
Figure 2B:
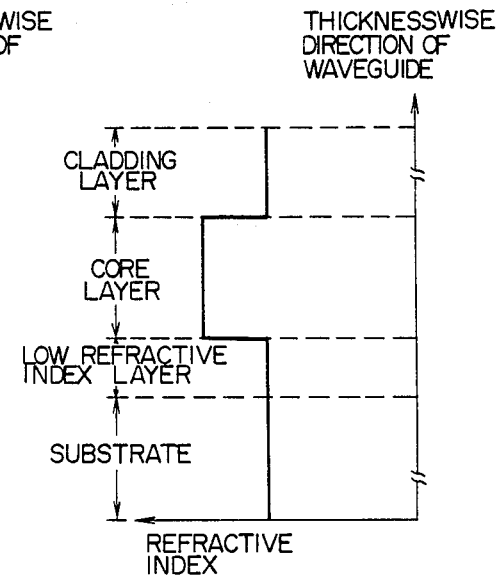

FIG. 2A to 2B illustrate a second embodiment of the optical waveguide device according to the invention, in which the thermal expansion coefficient of the cladding layer 9 is decreased, as the thickness thereof is increased. The core layers, the low refractive index layer and the substrate are identical with those of the first embodiment shown in FIGS. 1A and 1B. More specifically, the cladding layer 9 is formed from a phosphoborosilicate glass film which is realized by doping $SiO_2$ with $B_2O_3$ and $P_2O_5$; in such a profile that about 3 mol % of $B_2O_3$ and $P_2O_5$, respectively, are contained in the cladding layer 9 at the boundary with the core layers 6-1 and 6-2, wherein the contents of both dopants are decreased progressively by equal amount, as the thickness of the cladding layer 9 is increased, until the $SiO_2$-film of the layer 9 finally contains no dopants. The thickness of the cladding layer 9 is about 18 $\mu$m.

Figure 3A:
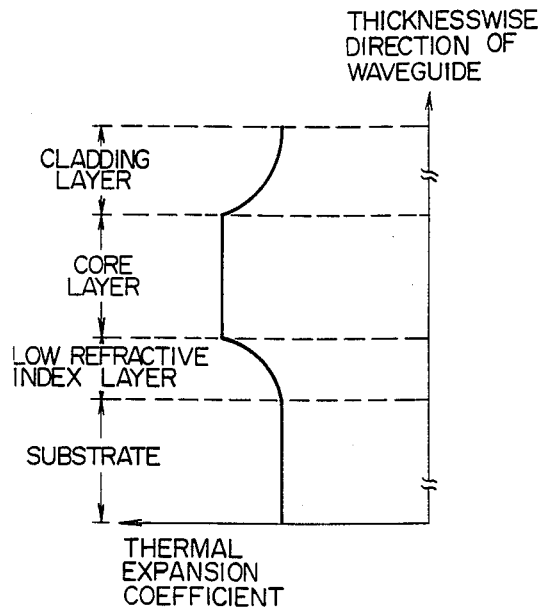
Figure 3B:
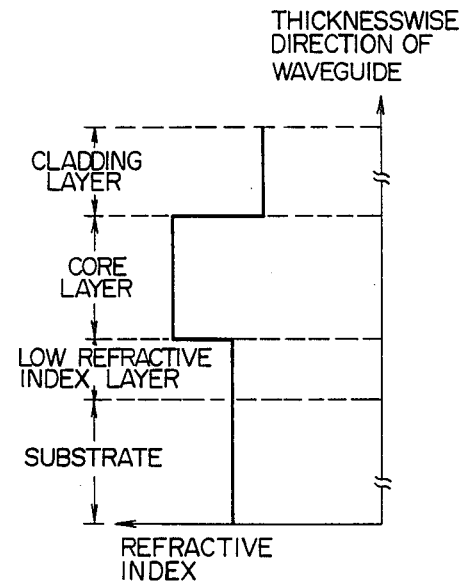

FIGS. 3A and 3B show a third embodiment of the optical waveguide device according to the invention, in which content of the dopant $B_2O_3$ in the cladding layer 9 is selected higher than that of $P_2O_5$ so that the refractive index of the cladding layer 9 is lower than that of the low refractive index layer 8. More specifically, the cladding layer 9 is realized by doping $SiO_2$ with 4 mol % of $B_2O_3$ and 2 mol % of $P_2O_5$, respectively, at the region in contact with the core layers 6-1 and 6-2 to form a glass film, wherein the contents of the dopants $B_2O_3$ and $P_2O_5$ are decreased, as the thickness of the cladding layer 9 is increased, while maintaining constant the content ratio of both dopants.

Figure 4A:
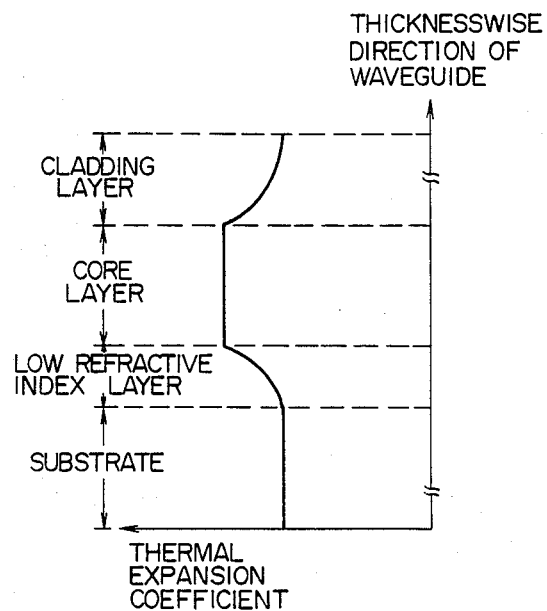
Figure 4B:
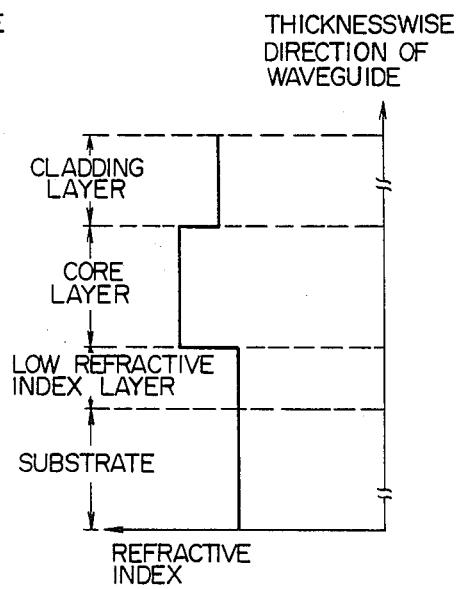

FIGS. 4A and 4B show a fourth embodiment of the optical waveguide device according to the invention, in which the content of the dopant $P_2O_5$ in the cladding layer 9 is selected higher than that of $B_2O_3$ so that the cladding layer 9 has a higher refractive index than the low refractive index layer 8.

Figure 5:
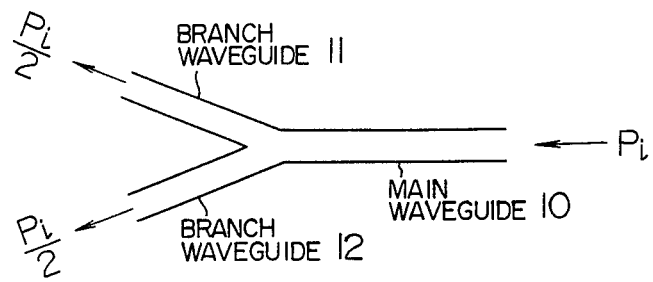
FIG. 5 shows an optical waveguide branching device to which the invention can be applied.
Figure 6:
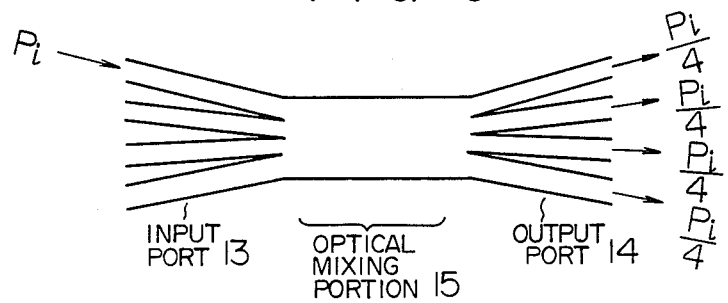
FIG. 6 shows an optical waveguide start coupler device to which the invention can be applied.
Figure 7:
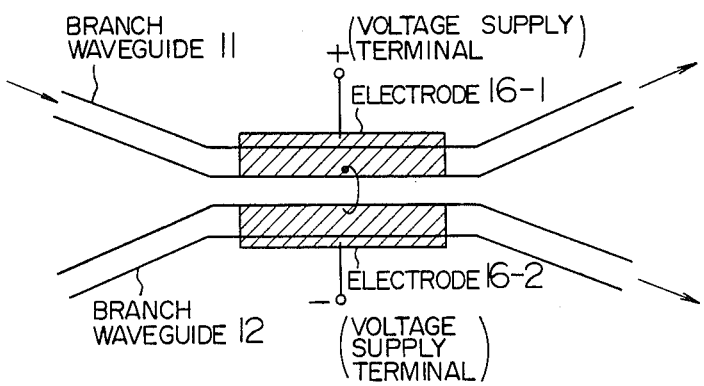
FIG. 7 shows an optical waveguide switch device to which the invention can be applied.

As will be appreciated from the above description of the embodiments of the invention, the present invention teaches that occurrence of thermal stress is minimized by making at least approximately equal to each other the thermal epansion coefficients at the boundaries between the core layers, the low refractive index layer and the cladding layer, to thereby reduce the shift of the center wavelength. It should however be understood that the present invention is never restricted to the illustrated embodiment but numerous modifications will readily occur to those skilled in the art without departing from the spirit and scope of the invention. By way of example, in addition to the combination of dopants $P_2O_5$ and $B_2O_3$ to be doped in $SiO_2$, there may be employed many other combinations of the dopants shown in FIGS. 11A and 11B such as, for example, combinations of $Al_2O_3$ and $B_2O_3$, $GeO_2$ and $B_2O_3$, $TiO_2$ and $P_2O_5$, $TiO_2$ and $P_2O_5$ and $B_2O_3$ and others. Further, the present invention can equally be applied to an optical branching device such as shown in FIG. 5, an optical star coupler such as shown in FIG. 6, an optical switch constituted by providing electrodes 16-1 and 16-2 on a cladding layer of a coupling region of a directional coupler as shown in FIG. 7, an optical modulator and others in addition to the optical waveguide coupling/branching device described hereinbefore. According to the teachings of the present invention, these optical waveguide devices can be realized with the shift of the center wavelength inclusive of deviation thereof brought about by variation in temperature being suppressed to a minimum, whereby optical waveguide devices of high performance (exemplified by reduction of cross-talk due to high degree of inter-wavelength isolation, reduction in the transmission loss and others) can be obtained. Besides, by virtue of the matched thermal expansion coefficient at the inter-layer boundary, generation of cracks and breakage of the glass film upon formation thereof can positively be prevented. Additionally, deviation in the length of the coupling region due to a bend of the substrate can also be excluded.

Next, a method of fabricating an optical waveguide device according to an embodiment will be described.

Figure 8:
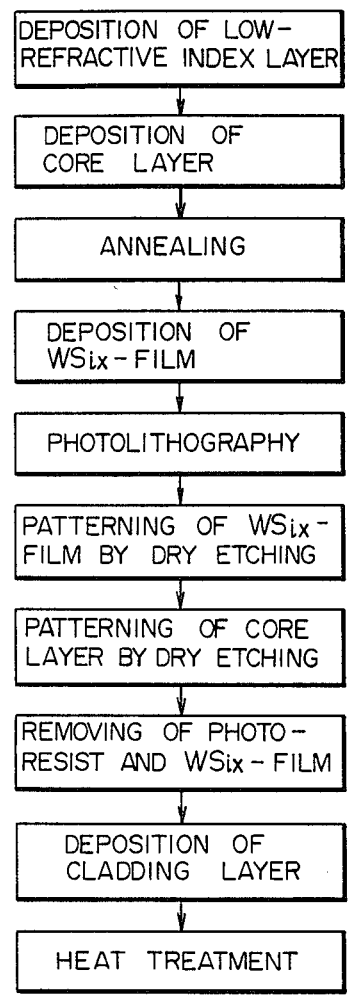
FIG. 8 is a view showing a method of fabricating an optical waveguide device according to an embodiment of the invention.

Referring to FIG. 8 which shows a manufacturing process, a low refractive index layer 8 is deposited on a substrate (which may be a $SiO_2$-substrate or other semiconductor substrate such as Si- or GaAs-substrate) by a low-temperature CVD method at a reaction temperature of 390° C. More specifically, a layer containing dopants $B_2O_3$ and $P_2O_5$ is formed on the $SiO_2$-substrate over a whole width thereof by blowing thereon monosilane gas, diborane gas and phosphine gas together with $O_2$-gas and $N_2$-gas. In that case, the flow rates of the diborane and phosphine gases, respectively, are controlled by gas flow controllers so as to be increased, as deposition of the film proceeds, in accordance with a predetermined control program. Subsequently, a core layer 6 is deposited on the low refractive index layer 8 thus formed. Deposition of this core layer 6 on the layer 8 is performed such that the thermal expansion coefficients of these layers 6 and 8 are at least approximately equal to each other at the boundary therebetween and that the core layer 6 has a higher refractive index than that of the low refractive layer 8. To this end, the diborane gas is not fed but only the monosilane and phosphine gases and $O_2$- and $N_2$-gases are blown to thereby form the film through deposition. After deposition of the film, anneal processing is conducted about one hour at a temperature of about 1200° C. in the $O_2$-atmosphere. Next, a $WSi_x$-film (where $x \approx 0.4$) is deposited in thickness of about 1 μm by sputtering. Thereafter, a photoresist film is formed over the $WSi_x$-film in a thickness of about 1.5 μm by application, being followed by patterning of the photoresist film by using a photomask. The sample undergone the patterning is then dry-etched by using a $NF_3$-gas to thereby carry out the patterning of the $WSi_x$-film. Subsequently, the sample is dry-etched by using a mixture gas of $C_2F_6$ and $CHF_3$ for thereby patterning the core layer 6 to form core patterns 6-1 and 6-2 of the directional coupler. After the photoresist and the $WSi_x$-film have been removed by etching, soot of glass to form a cladding layer 9 is deposited through a flame deposition process by using a flame hydrolysis burner. More specifically, soot is produced by using an oxyhydrogen burner of a coaxial fourtube structure, wherein vapours of $SiCl_4$, $POCl_3$ and $BBr_3$ are fed to the center tube of the oxyhydrogen burner with Ar-gas being used as a carrier gas to thereby bring about a flame hydrolysis reaction in the burner flame. The soot mentioned above consists of glass soot of $SiO_2$, $P_2O_5$ and $B_2O_3$. After deposition of the glass soot, vitrification of the soot is realized by heating about one hour at a temperature of about 1200° C. in the atmosphere of He.

It should be mentioned that the present invention is never restricted to the abovementioned method. By way of example, deposition of the glass film can also be realized by sputtering, vapour deposition, flame deposition, plasma CVD method and others in place of the CVD method described above.

Figure 9:
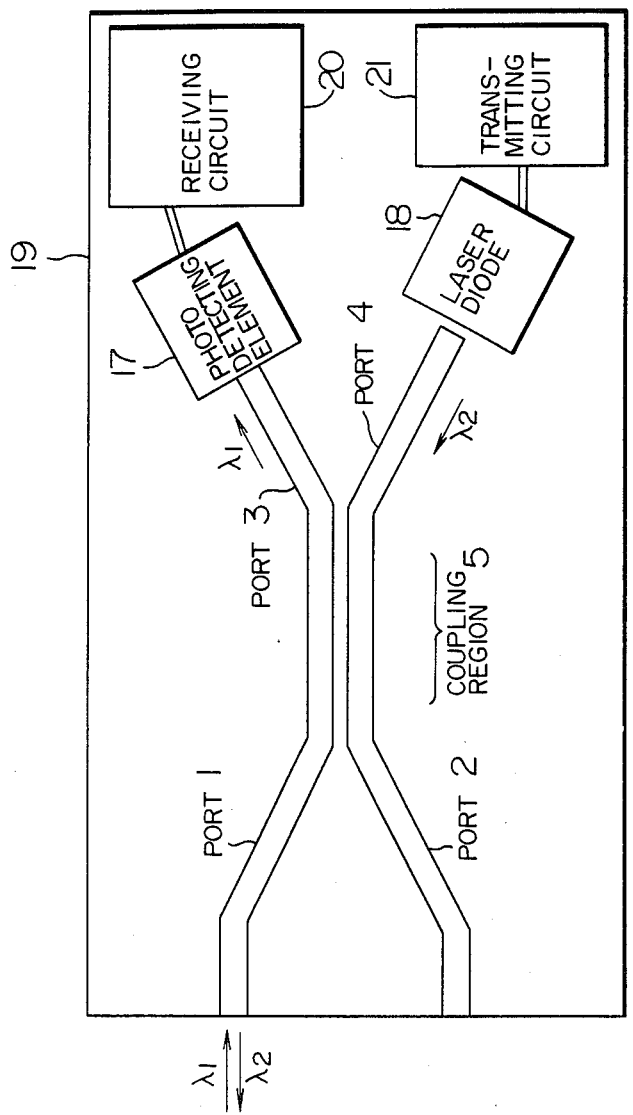
FIG. 9 is a plan view of an optical module to which an embodiment of the invention is applied.

In the foregoing, individual embodiments of the optical waveguide devices have been described separately. However, it goes without saying that the invention can equally be applied to combinations of the optical devices such as, for example, combinations of the optical waveguide coupling/branching devices shown in FIGS. 1A and 1B with the optical waveguide branching device shown in FIG. 5, combinations of the former with the optical switch shown in FIG. 7 or other combinations. Additionally, the present invention can find its application to an optical module composed of a combination of optical devices according to the invention such as an optical waveguide coupling/branching device, an optical switch and/or an optical waveguide branching device with a semiconductor laser, a light receiving element and others, as is shown in FIG. 9. More specifically, FIG. 9 shows an embodiment of the optical module resulting from combination of the optical waveguide coupling/branching device, a semiconductor laser 18 and the light receiving element 17. A light signal of wavelength $\lambda_1$ inputted to the optical module 19 is received by the light receiving element 17. On the other hand, a light signal of wavelength $\lambda_2$ emitted by the semiconductor laser 18 is oututted from a port 1 of the optical module through the optical waveguide coupling/branching device. Thus, a bidirectional transmission module with two wavelengths $\lambda_1$ and $\lambda_2$ can be realized. In FIG. 9, a reference numeral 20 designates an electric circuit serving for amplification and identification of the electric signal resulting from the conversion by the light receiving element 17 and for driving the light receiving element, and 21 denotes a transmitting circuit including a semiconductor laser drive circuit, a comparator circuit, a monitor circuit and others. In the device according to the present invention, the substrate is positively protected against a bend or warp. Accordingly, mounting of the active elements mentioned above will bring about substantially no degradation in the characteristics (such as deviation of the optical axis and others) to great advantage.

As will now be appreciated from the foregoing description, the matching in the thermal expansion coefficients at the boundaries between the core layer, clad layer and the low refractive index layer can be realized satisfactorily according to the teachings of the invention, whereby deviation (shift) of center wavelength in the optical waveguide branching characteristics, cracking of the glass film and other undesirable phenomena due to occurrence of thermal stress can be positively suppressed. Thus, there is provided the optical device of improved performance and enhanced reliability.

I claim:

1. An optical waveguide device, comprising a low refractive index layer having a refractive index $n_b$, a core layer having a refractive index $n_c$ (where $n_c > n_b$) and a cladding layer having a refractive index $n_{cl}$ (where $n_{cl} < n_c$) formed on a substrate, wherein thermal expansion coefficients of said low refractive index layer, said core layer and said cladding layers, respectively, are made substantially equal to each other at respective boundaries.

2. An optical waveguide device according to claim 1, wherein the thermal expansion coefficient of said low refractive index layer is varied substantially continuously in the direction thicknesswise of said layer.

3. An optical waveguide device according to claim 1, wherein said substrate is formed of $SiO_2$-glass.

4. An optical waveguide device according to claim 1, wherein said core layer is constituted by a pair of rectangular layers disposed in parallel with each other so that said rectangular layers are distributively coupled to each other.

5. An optical waveguide device according to claim 1, said core layer being of a rectangular form, wherein one end of a waveguide formed by said rectangular core layer is connected to at least two waveguides each formed by a rectangular core layer.

6. An optical waveguide device according to claim 1, said core layer being of a rectangular form, wherein each of two ends of a waveguide formed by said core layer is connected to at least two waveguides formed by rectangular core layers, respectively.

* * * * *